United States Patent
Park et al.

(10) Patent No.: US 10,856,242 B2
(45) Date of Patent: Dec. 1, 2020

(54) WIRELESS TIME AND FREQUENCY LOCK LOOP SYSTEM

(71) Applicant: PhasorLab, Inc., Billerica, MA (US)

(72) Inventors: Joshua C. Park, Billerica, MA (US); Glen Wolverton, Holden, MA (US)

(73) Assignee: PhasorLab, Inc., Billerica, MA (US)

( * ) Notice: Subject to any disclaimer, the term of this patent is extended or adjusted under 35 U.S.C. 154(b) by 0 days.

(21) Appl. No.: 15/820,427

(22) Filed: Nov. 21, 2017

(65) Prior Publication Data

US 2018/0146443 A1    May 24, 2018

Related U.S. Application Data

(60) Provisional application No. 62/424,762, filed on Nov. 21, 2016.

(51) Int. Cl.
| | |
|---|---|
| *H04W 56/00* | (2009.01) |
| *H04L 12/26* | (2006.01) |
| *H04L 5/00* | (2006.01) |
| *H04W 84/20* | (2009.01) |

(52) U.S. Cl.
CPC ......... *H04W 56/001* (2013.01); *H04L 5/0048* (2013.01); *H04L 5/0053* (2013.01); *H04L 43/0864* (2013.01); *H04L 43/106* (2013.01); *H04W 84/20* (2013.01)

(58) Field of Classification Search
CPC .. H04W 50/001; H04W 84/20; H04L 5/0048; H04L 43/0864; H04L 43/106; H04L 5/0053
See application file for complete search history.

(56) References Cited

U.S. PATENT DOCUMENTS

| | | |
|---|---|---|
| 5,732,113 A | 3/1998 | Schmidl et al. |
| 6,542,754 B1 | 4/2003 | Sayers et al. |
| 6,563,893 B2 | 5/2003 | Smith et al. |
| | (Continued) | |

OTHER PUBLICATIONS

"Phase-locked loop", Wikipedia, the Free Encyclopedia, Nov. 16, 2016, retrieved from https://en.wikipedia.org/w/index.php?title=Phase-locked_loop&oldid=749984451.

(Continued)

*Primary Examiner* — Walter J Divito
*Assistant Examiner* — Anthony Luo
(74) *Attorney, Agent, or Firm* — Michael Saji (57) ABSTRACT

Systems and methods for wireless synchronization are disclosed. In one embodiment, a method is disclosed for synchronizing a slave device to a master device, comprising: receiving, at a local device, a master device reference signal in the form of a modulated radio frequency (RF) signal from a master device; receiving, at the local device, a master device time stamp from the master device; computing a time offset of the master device reference signal relative to a local reference oscillator signal of a local oscillator, using the master device time stamp; computing a frequency offset of the master device reference signal relative to the local reference oscillator signal; generating a local reference oscillator control signal based on the computed time offset and the computer frequency offset; and adjusting the local reference oscillator to maintain a frequency and time lock with the master device reference signal at the local device.

18 Claims, 7 Drawing Sheets

(56) References Cited

U.S. PATENT DOCUMENTS

| | | | |
|---|---|---|---|
| 6,980,589 B1* | 12/2005 | Babb | H03J 1/005 |
| | | | 375/222 |
| 6,985,549 B1* | 1/2006 | Biracree | H04L 7/0004 |
| | | | 375/355 |
| 7,409,022 B2 | 8/2008 | Dai et al. | |
| 7,630,428 B2 | 12/2009 | Rasmussen et al. | |
| 8,041,310 B2 | 10/2011 | Nilsson et al. | |
| 8,064,293 B2 | 11/2011 | Tabatabaei | |
| 8,306,014 B1 | 11/2012 | Vandwalle et al. | |
| 8,604,851 B2 | 12/2013 | Lee et al. | |
| 8,831,044 B1 | 9/2014 | Vandwalle et al. | |
| 9,048,979 B2 | 6/2015 | Park | |
| 9,048,980 B2 | 6/2015 | Park | |
| 9,112,614 B2 | 8/2015 | Randel et al. | |
| 2002/0197989 A1* | 12/2002 | Cruder | H04W 84/14 |
| | | | 455/426.1 |
| 2008/0037693 A1* | 2/2008 | Andrus | H04L 1/0057 |
| | | | 375/359 |
| 2009/0088085 A1 | 4/2009 | Nilsson et al. | |
| 2009/0296866 A1* | 12/2009 | Hsieh | H04J 3/0685 |
| | | | 375/371 |
| 2010/0142632 A1* | 6/2010 | Koo | H04L 27/2657 |
| | | | 375/260 |
| 2010/0254311 A1 | 10/2010 | Simeone et al. | |
| 2012/0163519 A1* | 6/2012 | Choudhury | H04L 7/033 |
| | | | 375/354 |
| 2013/0163617 A1* | 6/2013 | Chandra | H04J 3/0667 |
| | | | 370/503 |
| 2013/0301635 A1 | 11/2013 | Hollabaugh et al. | |
| 2014/0093023 A1* | 4/2014 | Park | H04L 7/0016 |
| | | | 375/362 |
| 2017/0286359 A1* | 10/2017 | McGowan | G06F 13/4291 |
| 2018/0206075 A1* | 7/2018 | Demirdag | H04W 4/023 |

OTHER PUBLICATIONS

"Phase-locked loop ranges", Wikipedia, the Free Encyclopedia, Nov. 17, 2016, retrieved from https://en.wikipedia.org/w/index.php?title=Phase-locked_loop_ranges&oldid=749857473.

* cited by examiner

WIRELESS TIME AND FREQUENCY LOCK LOOP SYSTEM

CROSS-REFERENCE TO RELATED APPLICATIONS

The present application claims the benefit of priority under 35 U.S.C. § 119(e) to U.S. Provisional App. No. 62/424,762, filed Nov. 21, 2016 and entitled "Wireless Time and Frequency Lock Loop System," which is hereby incorporated by reference in its entirety for all purposes.

In addition, the following references are hereby incorporated by reference in their entirety for all purposes: Joshua C. Park, "RF Carrier Synchronization and Phase Alignment Methods and Systems," U.S. Pat. No. 9,048,980, Oct. 1, 2013; Joshua C. Park, "RF Carrier Synchronization and Phase Alignment Methods and Systems," U.S. Pat. No. 9,048,979, Oct. 1, 2013; Pierre Vandwalle, "System and Method For Synchronizing Clocks In A Wireless Local Area Network," U.S. Pat. No. 8,831,044 B1, Sep. 9, 2014; James M. Hollabaugh, et al., "Methods and Apparatus For Synchronizing clock Signals In A Wireless System," U.S. Patent Application US2013/0301635 A1, Nov. 14, 2013; Pierre Vandwalle, "System and Method For Synchronizing Clocks In A Wireless Local Area Network," U.S. Pat. No. 8,306,014 B1, Nov. 6, 2012; Hui Dai et al., "Synchronizing Clocks In Wireless Personal Area Networks," U.S. Pat. No. 7,409,022 B2, Aug. 5, 2008.; Ian Leslie Sayers, et al., "Synchronizing Clock Signals In Wireless Networks," U.S. Pat. No. 6,542,754 B1, Apr. 1, 2003; Stephen F. Smith, et al., "Carrier-Frequency Synchronization system For Improved Amplitude Modulation and Television Broadcast Reception," U.S. Pat. No. 6,563,893 B2, May 13, 2003; Timothy M. Schmidl, et al., "Timing And Frequency Synchronization of OFDM Signals," U.S. Pat. No. 5,732,113, Mar. 24, 1998.

BACKGROUND

A phase-locked loop or phase lock loop, abbreviated as PLL, is a control system that generates an output signal whose phase is related to the phase of an input signal. There are several different types; the simplest is an electronic circuit comprising a variable frequency oscillator and a phase detector in a feedback loop. The oscillator generates a periodic signal, and the phase detector compares the phase of that signal with the phase of the input periodic signal, adjusting the oscillator to keep the phases matched.

A typical PLL will use voltage adjustment to match the phase of the training timer and reference timer. This last step creates the closed-loop system that allows this to be called a "lock." In a locked state, phase error fluctuations and frequency error are small, such that the PLL system is able to return the system to a locked state after small perturbations of the phases and filter state.

A typical PLL system has tight bounds within which two signals may be kept in synch. When two signals are out of synch by over a particular amount, the signals may fail to reach a locked state or may exit a locked state.

Phase-locked loops are widely employed in radio, telecommunications, computers and other electronic applications. They can be used to demodulate a signal, recover a signal from a noisy communication channel, generate a stable frequency at multiples of an input frequency (frequency synthesis), or distribute precisely timed clock pulses in digital logic circuits such as microprocessors. Since a single integrated circuit can provide a complete phase-locked-loop building block, the technique is widely used within modern electronic devices, with output frequencies from a fraction of a hertz up to many gigahertz, as well as wireless ones, where they are used to generate carrier frequencies. A PLL is an electronic circuit and does not operate wirelessly across multiple devices.

SUMMARY

A state of Time and Frequency Synchronization (i.e., perfectly phase locked status) within a network can be achieved when the network is sharing a reference frequency source from a single source, and the delays from this source node to individual units are precisely known. A straightforward way of achieving such status would be to use physical wires to connect from a single frequency source to multiple units using wires with same length or known delays. For wirelessly connected networks, however, achieving this status or a synchronization level comparable to such wired system is extremely difficult. In this document, we describe Wireless Time and Frequency Lock Loop (WTFLL) System, which can be used as a wireless network synchronization method that achieves high degree of frequency and time synchronization in a wireless network.

The present disclosure collectively and coherently takes into account all observable parameters (e.g., time offset, frequency offset, delay from physical separation, Doppler effect, etc.) that impact the overall synchronization quality between two wirelessly linked nodes attempting to achieve Time and Frequency Synchronization. The net outcome of this comprehensive approach to synchronization is a Wirelessly Time and Frequency Locked System. Such Highly Synchronized Wireless Network can enable many new applications in wireless communication field such as: (1) Synchronized Coordination of Multiple Cellular nodes for higher data capacity, (2) Highly Accurate Network-based Positioning and Tracking, (2) Synchronized cameras and 3-D videos for AR or VR, (3) Self-driving and Connected Vehicles, (4) autonomous synchronized fleet of drone or vehicle, just to name a few.

Systems and methods for wirelessly synchronizing frequency and time offset are disclosed. In one embodiment, a method is disclosed for synchronizing a slave device to a master device, comprising: receiving, at a local device, a master device reference signal in the form of a modulated radio frequency (RF) signal from a master device; receiving, at the local device, a master device time stamp from the master device; computing a time offset of the master device reference signal relative to a local reference oscillator signal of a local oscillator, using the master device time stamp; computing a frequency offset of the master device reference signal relative to the local reference oscillator signal; generating a local reference oscillator control signal based on the computed time offset and the computer frequency offset; and adjusting the local reference oscillator to maintain a frequency and time lock with the master device reference signal at the local device.

The method may further comprise adjusting the local reference oscillator to maintain frequency and time lock with the master device reference signal at the local device, and the local reference oscillator may be a voltage controlled crystal oscillator. The method may further comprise extracting both the master device time stamp and the master device reference signal from the modulated RF signal from the master device. Computing the time offset and the frequency offset may be performed using baseband signal samples of the master device reference signal. The method may further comprise adjusting the local reference oscillator to increase frequency based on the frequency offset signal and time offset signal each having a positive magnitude. The method may further comprise adjusting the local reference oscillator to decrease frequency based on the frequency offset signal having a positive magnitude and the time offset signal having a negative magnitude. The method may further comprise maintaining the time offset and the frequency offset within a hold-in range of the frequency and time lock. The method may further comprise using high-resolution time sample interpolation and correlation for computing the time and frequency offsets. The method may further comprise sending, from the local device to the master device, a first time stamp message, and receiving, from the master device, a second time stamp message, the second time stamp message including a first time stamp message receipt time, thereby exchanging time stamp measurements. The method may further comprise calculating a path delay based on the first and the second time stamp messages, and using the calculated path delay to determine a primary frequency offset component and a Doppler-induced frequency offset component of the master device reference signal. The method may further comprise monitoring a derivative of time offset and using the derivative to perform frequency offset computation. The method may further comprise computing the frequency offset by performing blind carrier synchronization using squares or absolute values of an in-phase signal and a quadrature signal of an arbitrary signal with orthogonal in-phase and quadrature signal components. The method may further comprise computing the frequency offset by accumulating a cumulative phase measurement of a plurality of differential phases between successive complex signal points greater than a threshold. The method may further comprise extracting a Doppler shift offset component from frequency offset of the master device reference signal, and adjusting the local reference oscillator while the local device may be in motion relative to the master device.

In another embodiment, a system for synchronizing a slave device to a master device is disclosed, comprising: an antenna configured to receive a master device reference signal from the master device via a wireless modulated radio frequency signal; a tunable reference crystal oscillator for outputting a reference signal at the slave device; a time offset detector coupled to a local reference output of a reference crystal oscillator and to a time stamp extractor, the time stamp extractor configured to extract a master device time stamp from the master device reference signal, the time offset detector configured to detect a relative timing difference between the local reference output and the master device time stamp; a frequency offset detector coupled to the local reference output of the reference crystal oscillator and to the master device reference signal output of the antenna, the time offset detector configured to detect a relative frequency offset between the local reference output and the master device reference signal output; a time and frequency control logic circuit coupled to an output of the time offset detector and an output of the frequency offset detector and outputting a reference crystal oscillator control signal based on whether the master device reference signal may be leading or lagging the reference crystal oscillator reference signal in time, and also based on whether the master device has a carrier frequency that is faster or slower than that of the slave device; and a digital loop filter coupling the reference crystal oscillator control signal to the reference crystal oscillator, thereby providing a closed loop control system for both frequency offset and time offset of the reference crystal oscillator to be synchronized wirelessly with the master device reference signal in a single processing chain, enhancing effectiveness of both frequency offset and time offset adjustment.

The master device reference signal may be an arbitrary wireless signal with a known carrier frequency. The time offset detector may further comprise a high-precision time interpolation circuit. The time and frequency control logic circuit may be further configured to output the reference crystal oscillator control signal based on whether: the reference crystal oscillator reference signal may be running fast and leading the master device; the reference crystal oscillator reference signal may be running fast and lagging the master device; the reference crystal oscillator reference signal may be running slow and leading the master device; or the reference crystal oscillator reference signal may be running slow and lagging the master device. The slave device may be configured to exchange time stamps with the master device by sending, from the local device to the master device, a first time stamp message, and receiving, from the master device, a second time stamp message, the second time stamp message including a first time stamp message receipt time; and The master device may be configured to process the first time stamp message and generate the second time stamp message at a PHY processing layer. A high precision time interpolation circuit may be used to perform time stamping at a time stamping resolution finer than a sampling clock of the slave device.

DETAILED DESCRIPTION

A PLL works by sensing the edge of the received signal and aligning signals of a carrier with the reference signal from the crystal. (PFD: phase frequency detector; LF or LPF: low pass filter.) The alignment often takes the form of a single bit feedback loop that brings the clock into alignment with the reference signal. However, recreating a PLL wirelessly is difficult, given the challenges of the wireless medium. Coarse-grained corrections are unreliable; frequency and time offsets are gathered separately due to prior art systems being driven by a digital clock cycle, causing these separate corrections to have limited accuracy because they are interrelated; and because of the imprecision and error inherent in synch over the wireless medium, wirelessly closing the loop and "locking" two signals is very challenging.

To overcome these issues, the inventors have conceptualized a "wireless PLL" that includes the master unit and trains the reference crystal (VCXO) at the slave. Both time and frequency synchronization is performed at the same time (i.e., on the same signal input samples). Our system is digital but requires very high resolution interpolator to achieve the resolution of an analog discrete solution. Baseband samples are used because they preserve both time and frequency offsets. The baseband samples can be tapped and used for this purpose. In some embodiments, when an initial time sync is performed, the method does not need to exchange information or special signals digitally with the master ("blind").

The inventors have appreciated that by monitoring simultaneously the Time and Frequency offsets and by constructing a coherent Time and Frequency Control Logic Operations accordingly, we achieve much more accurate and stable Synchronization between the two wirelessly linked nodes in terms of both Time and Frequency.

In this document, we describe in detail how we achieve such accurate synchronization of Time and Carrier Frequency by means of Wirelessly Linked Closed Loop System, which includes the following key functions as well as other more common operations: High-Resolution Time Edge Comparison through high-degree of time interpolation; Time Offset monitoring by means of Time Stamp Exchange (TSE); Time Drift Monitoring; Carrier Frequency Offset Calculation and/or Monitoring; Time and Frequency Control Logic; Digital Loop Filter for Controlling Time and Frequency Control Loop.

Overall System Architecture

Within a physical hardware unit of a communication subsystem, such as a RF front-end radio, a Phase Lock Loop (PLL) is a wired system and it achieves a precise synchronization (Lock) of the frequency and phase between the reference device (e.g., reference crystal oscillator) and the local oscillator (e.g., voltage-controlled oscillator, VCO.) In contrast, in a typical wireless communication link, the frequency synchronization and the time synchronization of the two wireless nodes (such as a cellular base station and a mobile unit) are performed as separate operations. As a result, these two operations do not achieve the level of phase (time) and frequency lock observed in a PLL residing within one physical hardware, such as within a RF front-end hardware system.

Here, we present a wirelessly operating Time and Frequency Lock Loop system, which operates as a single coherent closed loop system. This new approach achieves much higher degree of synchronization of Time and Frequency between two physically separated radio transceiver units (master and slave units). As a result, the two separate system clocks (master unit clock and slave unit clock) effectively achieve Time and Frequency Lock without sharing any physical hardware between the reference master unit (MU) and the slave unit (SU). The overall system diagram of such a Wireless Time and Frequency Lock Loop (WT-FLL) system is depicted in the FIG. 1 below.

Figure 1:
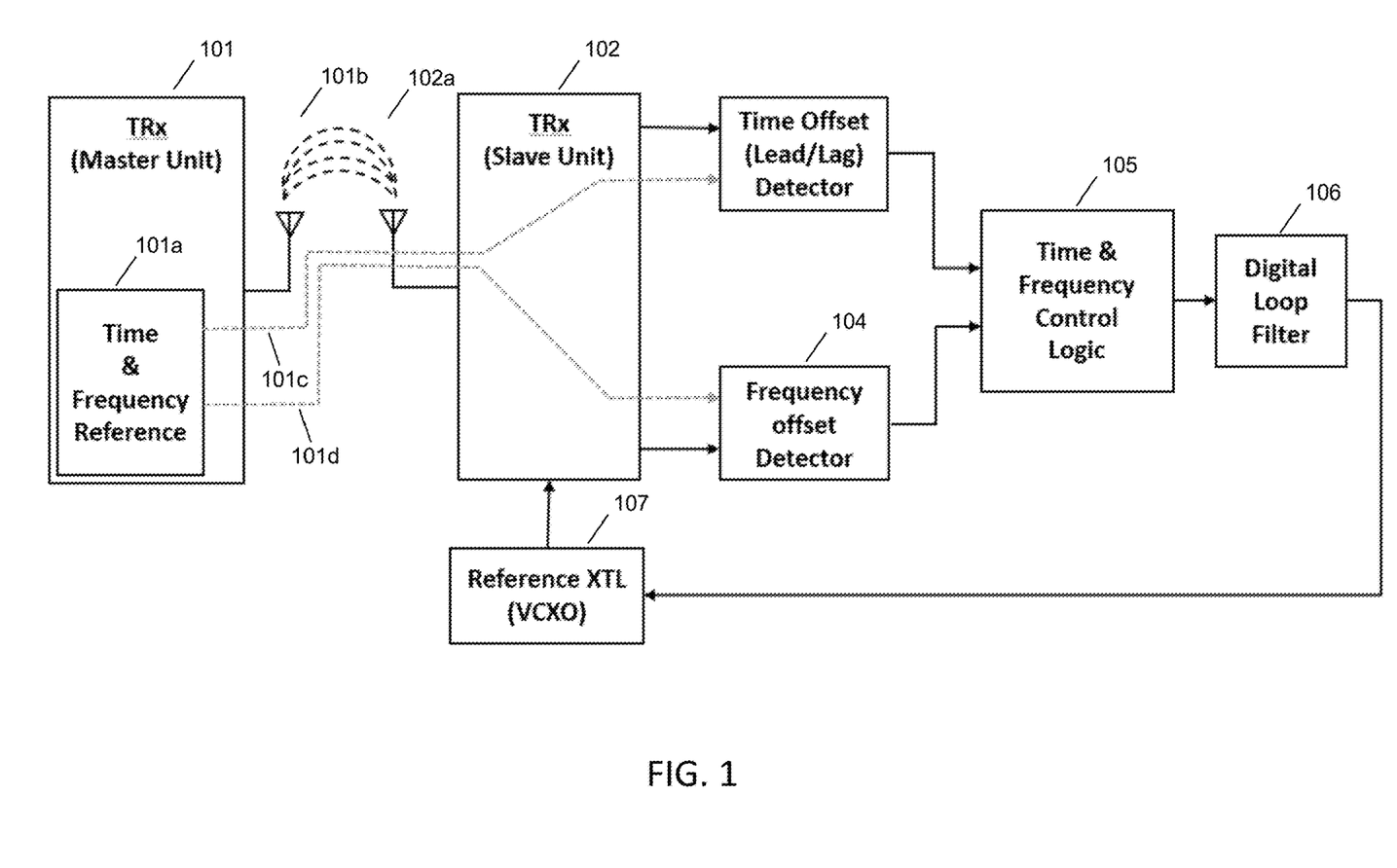
FIG. 1 is a schematic block diagram of a master and slave wireless synchronization system, in accordance with some embodiments.

FIG. 1 shows a wirelessly synchronized Time and Frequency Lock Loop System, namely, a schematic block diagram of a master and slave wireless synchronization system, in accordance with some embodiments. In FIG. 1, a master unit transmit/receive unit (TRXU) 101 that includes a time and frequency reference 101a as shown. The frequency reference 101a is shown with a wireless connection via antenna 101b to slave unit transmit/receive unit (TRXU) 102. Time and frequency reference 101a also is connected to the slave unit 102 via the wireless connection, and a time offset signal 101c and a frequency offset signal 101d are shown. In some embodiments, the frequency offset signal received from the master device is called a master device reference signal, and the time offset signal received from the master device is or contains a time stamp, and is called a master device time stamp, in the present disclosure. In some embodiments a specific signal is sent from the master unit 101; however, it is noted that in some embodiments no special signal 101c, 101d are needed, as these offsets can be derived directly from the carrier signal of the master unit, which is received by the slave unit during any data transmission according to any protocol, making the present synchronization system able to operate as a "blind synchronization" system without embedded beacons or prearranged messages, in certain embodiments. Typically, a time stamp is used for time offset signal 101c, and any RF carrier is used for frequency offset signal 101d.

Slave unit transmit/receive unit (TRXU) 102 has an antenna 102a, and sends the time offset signal 101c to the time offset detector 103 and the frequency offset signal 101d to the frequency offset detector 104. In the case that the time and/or frequency offset are derived at the slave and not received as a prearranged synchronization message or time stamp, the received signal may be the carrier signal (e.g., signal samples) and the slave unit TRXU may send it to both the time offset detector 103 and the frequency offset detector 104. The signal samples may be baseband signal samples. Slave TRXU also is part of the signal loop for the reference crystal 107, and passes the reference crystal signal onto the time offset detector and the frequency offset detector.

The time offset detector 103 performs measurement of the signal path delay for the wireless transmission between the master and slave TRXUs. One method for doing so is by time stamp exchange, as described elsewhere herein; in some methods at least one time stamp may be used to bring the master and slave into an initial synchronization state. Another method for doing so is to perform phase offset detection by comparing the timing signal from the reference crystal and the received baseband signal samples from the master TRXU. These methods may be used in conjunction with each other, as the methods have different granularity and applicable ranges, and hence different applications. If a time stamp is used, the time stamp may be extracted from the time stamp message using any means as would be understood by one having skill in the art, such as examining a received bit vector or demodulating a message and decoding the text of the message.

The frequency offset detector 104 performs measurement of the carrier frequency offset between the master and the slave units. As with the time offset detector, multiple methods can be used in conjunction. In a first method, the information from the time offset detection module may be used over time to determine whether the slave unit is gradually slowing down or gradually speeding up, which provides the sign of whether to increase or decrease the clock of the slave unit. In this method, an additional coupling may exist between the time offset detector 103 and the frequency offset detector 104, or a memory or data store could be used to store the time stamp messages for use by either or both of time and frequency offset detectors 103 and 104. In a second method, the frame data or preamble content of a particular message can be used to determine the direction and rate of phase rotation, which can be used to estimate frequency offset. In a third method, a non-preamble blind carrier synchronization technique can be used to estimate the frequency offset in the case of having available I and Q samples; for example, the use of squares or absolute values of the in-phase and quadrature samples could be used. In some embodiments, a carrier frequency may be known in advance, either from past communications or via configuration.

The output of the time offset detector 103 and the output of the frequency offset detector 104 are fed into the time and frequency control logic 105. This logic circuit performs a test to determine whether the reference clock should be sped up or slowed down. The time and frequency logic is described more fully at FIG. 5.

The output of the time and frequency control logic 105 is a digital loop filter 106, such as a low pass filter. The low pass filter performs its typical function as in a PLL, providing filtering of the control signal to reduce jitter and allowing the oscillator to converge to a stable final voltage that is locked onto the input voltage. The digital loop filter may be used to determine the upper limit on the PLL's response.

The output of the digital loop filter is sent as a control signal to the reference crystal 107, completing the closed loop. Reference crystal 107 may have a voltage control for tuning the crystal, enabling the local device to stay in frequency and time lock with the master device. To maintain lock, the system may attempt to keep the time offset and frequency offset within a hold-in range, which is the range within which any perturbations can be damped so as to return the system to a locked state.

Time and carrier frequency of Master node are carefully monitored and its outcome collaboratively decides the way the reference crystal of slave node is being controlled.

As the two nodes communicate through wireless medium they can exchange time and frequency information. However, the accuracy and reliability such information is being passed from Master Unit(MU) to the Slave Unit(SU) is limited by the physical separation. For example, the time information can be sent by the MU to the SU; however, the delay associated with the physical separation as well as the finite resolution of the local clocks (both in MU and SU) make accurate alignment of time very difficult if not impossible without resorting to a very specialized timing hardware. In addition, synchronization of their carrier frequencies adds as extra challenge that cannot be met using a readily available hardware solution. As a result, in today's common communication systems such as WiFi networks or Cellular Networks, the time synchronization and frequency synchronization are performed frame-by-frame basis and as completely independent processes despite the fact that the synchronization procedures of Time and Frequency directly affect each other.

Figure 2:
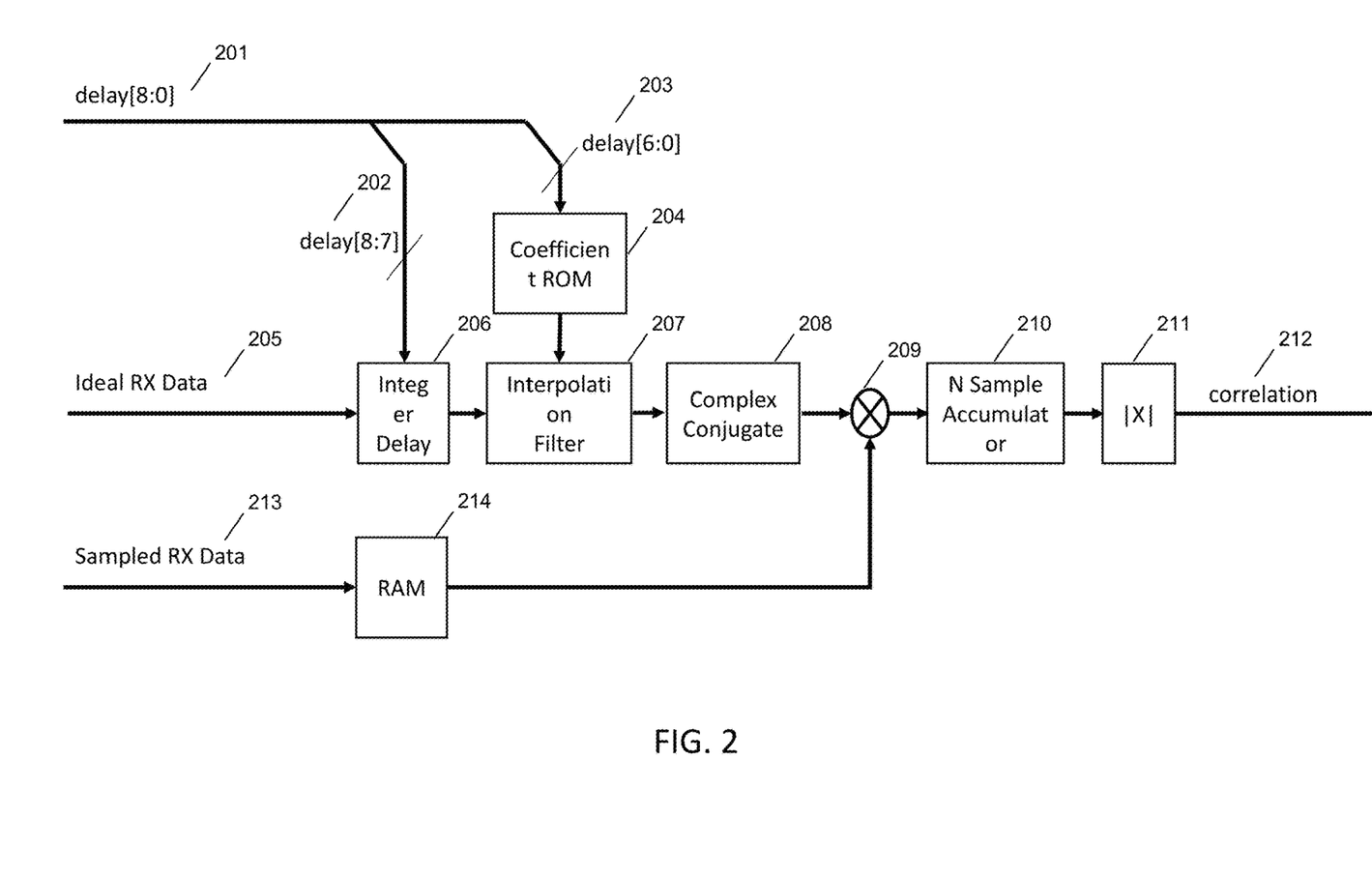
FIG. 2 is a schematic block diagram of an interpolating correlator, in accordance with some embodiments.

FIG. 2 is a schematic block diagram of an interpolating correlator, in accordance with some embodiments. The depicted interpolating correlator architecture enables high-resolution time stamping. In some embodiments, received sample I/Q data is stored during the packet detection process. When a packet is detected, a rough time stamp is stored for use as a basis for determining a high-resolution time stamp. A more precise packet arrival time (time stamp) can be obtained by interpolating and correlating N samples of the stored received data against an ideal version of the received packet. In some embodiments, a search may be run to find a delay value which, when applied to the ideal data in above configuration, results in a highest value of the correlation of the received data and the ideal version of the data. The high-resolution time stamp value is obtained by searching for this optimal delay value using this high-resolution interpolating correlator. "Resolution" as used in this section refers to granularity of time measurement.

As shown, sampled RX data 213 is received and stored in random access memory (RAM) 214. The RX data is data corresponding to a predetermined part of the signal, such as a preamble portion of a signal, in some embodiments, and this predetermined part of the signal is provided to the correlator circuit as ideal RX data 205. A 9-bit control line, delay[8:0] 201, which may be a different number of bits in some embodiments with no loss of generality, is used to control a delay parameter. The highest two bits of the control line, delay[8:7] 202, are branched off from the delay line and fed into an integer delay circuit 206, which applies a coarse delay to the ideal RX data signal 205. This coarse delay may be based on the rough time stamp, in some embodiments, or may be adjusted in the search procedure. The remaining seven bits of the control line, delay[6:0] 203, are sent to coefficient read-only memory (ROM) 204 and are used to perform a lookup of a previously-stored interpolation coefficient. In some embodiments, the interpolation coefficient may be a complex coefficient. The coefficient is sent to the interpolation filter circuit 207, which takes the integer-delayed RX data and applies the interpolation coefficient. This may be understood to be interpolation of a particular high-resolution time stamp, in some embodiments, as the ideal data has now been shifted in time with multiplication of the interpolation coefficient to obtain samples ideal in time. This "shifted" pattern is correlated against the actual received data.

In some embodiments, continuing on, the output of the interpolation filter is sent to complex conjugate circuit 208, to obtain the real part of the signal, which is then mixed at mixer 209 with the sampled RX data from the RAM 214, to correlate the ideal signal to the received sampled data. N such samples are accumulated at circuit 210, and an absolute value 211 is taken to obtain the magnitude of the complex signal, before output of a final correlation at step 212. This correlation value may be fed back into the system to perform a search of the correlation space. Once the highest correlation value has been found, the corresponding interpolated high-resolution time stamp is used for offset correction as described below.

Various components shown may be implemented using different technologies, e.g., EEPROM, FPGAs, etc., as would be clear to one having skill in the art.

Time Offset Measurement

Figure 3:
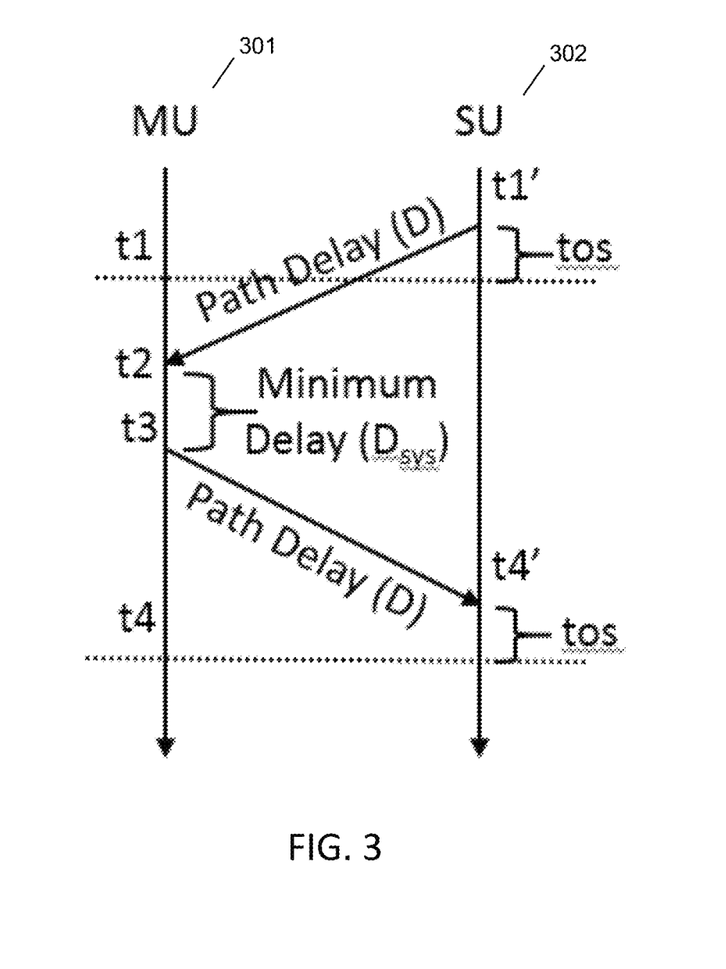
FIG. 3 is a schematic messaging diagram of time stamp exchanges in order to achieve time synchronization between a master and a slave, in accordance with some embodiments.

In order to accurately compare the two time clocks (MU and SU), we need to be able to measure accurately the signal path delay, and exchange Time Stamp measurements. FIG. 3 below shows how the path delay (D) and the time offset between MU and SU are extracted by means of Time Stamp Exchange (TSE). In this example, the Time Stamp Exchange is first initiated by SU by sending (t1') in a packet to MU. MU unit records its arrival time (t2) and sends a new packet back to SU immediately with a new time stamp (t3) as well as the received value of t1' and t2. SU receives this new package with time stamps (t1', t2, t3) at time t4'. Using these four time stamp values, SU can now calculate the Path Delay(D) as well as the time offset (t_os) between the MU and SU. This time stamp exchange can also be initiated by MU with similar outcome.

FIG. 3 is a schematic messaging diagram of time stamp exchanges in order to achieve time synchronization between a master and a slave, in accordance with some embodiments. In some embodiments, time offset can be calculated by exchanging time stamp messages, as shown. No special message content is required beyond a suitable encoding for the time stamps, and the messages should be lightweight so that they can be received, processed, and sent within a time that consistently reflects a minimum delay of the system, so as to provide a high accuracy synchronization. Shown are the master unit 301 and slave unit 302. At time t1', slave unit 302 sends a timing message to master unit 301. At time t2, the message arrives at the master unit. At time t3, which follows t2 by minimum delay Dsys, a return message is sent by the master unit 301 to the slave unit 302. At time t4', the return message arrives at the slave unit. tos represents the time offset between the master and the slave and D represents the path delay.

The time stamp exchange is initiated by SU by sending (t1') in a packet. MU unit records its arrival time (t2) and sends it back immediately with a new time stamp (t3) as well as received t1' and t2 values. SU receives this time stamp values (t1', t2, t3) at time t4'. Using these four time stamps, SU can calculate the Path Delay(D) as well as the time offset (t_os) between the MU and SU.

Once the Path Delay (D) and the time offset (t_os) are known SU unit can accurately determine whether its local time is Leading or Lagging with respect to that of MU. The accuracy of overall Time and Frequency Lock Loop depends on the accuracy and reliability of this Time Offset (t_os) Detection to a degree. In order to achieve high degree of Time Offset (t_os) detection accuracy the method employs one or more of the following techniques: Improving received packet time stamping resolution beyond the sampling clock resolution by applying a high degree of time interpolation during the preamble detection, as described above; measuring Time Offset (t_os) through Time Stamp Exchange (TSE); Minimizing time delay between the timestamp packet arrival and reply time (Dsys) by means of implementing TSE operations in Physical Layer (PHY) hardware (L1 layer) as opposed to implementing at a higher layer (e.g., using a hardware-based implementation instead of a software-based implementation); or averaging multiple TSE Time Offset measurements closely spaced in time to obtain high precision.

The following equations apply to the time stamp exchange shown in FIG. 3:

$$t_{os} \triangleq t_4 - t'_4 = t_1 - t'_1$$

$$t_2 = t_1 + D = (t'_1 + t_{OS}) + D$$

$$t_4 = t'_4 + t_{OS} = t_3 + D$$

$$t_2 = (t'_1 + t_{OS}) + D$$

$$t'_4 = t_3 + D = t_{OS}$$

$$D = \frac{t_2 - t'_1 + t'_4 - t_3}{2}$$

Averaged time offset and carrier frequency offset are used as inputs to the Time and Frequency Control Logic that produces appropriate control signals for the reference crystal. The Time Offset and Carrier Frequency Offset are measured at regular intervals to maintain tight limits on the SU clock.

Frequency Offset Detection

Three ways of detecting carrier frequency offset between MU and SU are provided, in some embodiments. The methods may be combined or used independently.

Method 1: The first method is to utilize the information from Time Offset Detection module. By monitoring the trend (or gradient) in the time offset measured using the Time Stamp Exchange, we can observe whether the SU time is running faster or slower compared to that of MU. If SU time is gradually slowing down this means that the SU carrier frequency is lower, and vice versa. We can use this information to estimate the instantaneous Frequency Offset sign (fast or slow) and value. Another way to describe this is to say that we are monitoring the derivative of the Time Offset and using it as the Frequency Offset indicator. The step-by-step operation of this method is described in FIG. 4.

Figure 4:
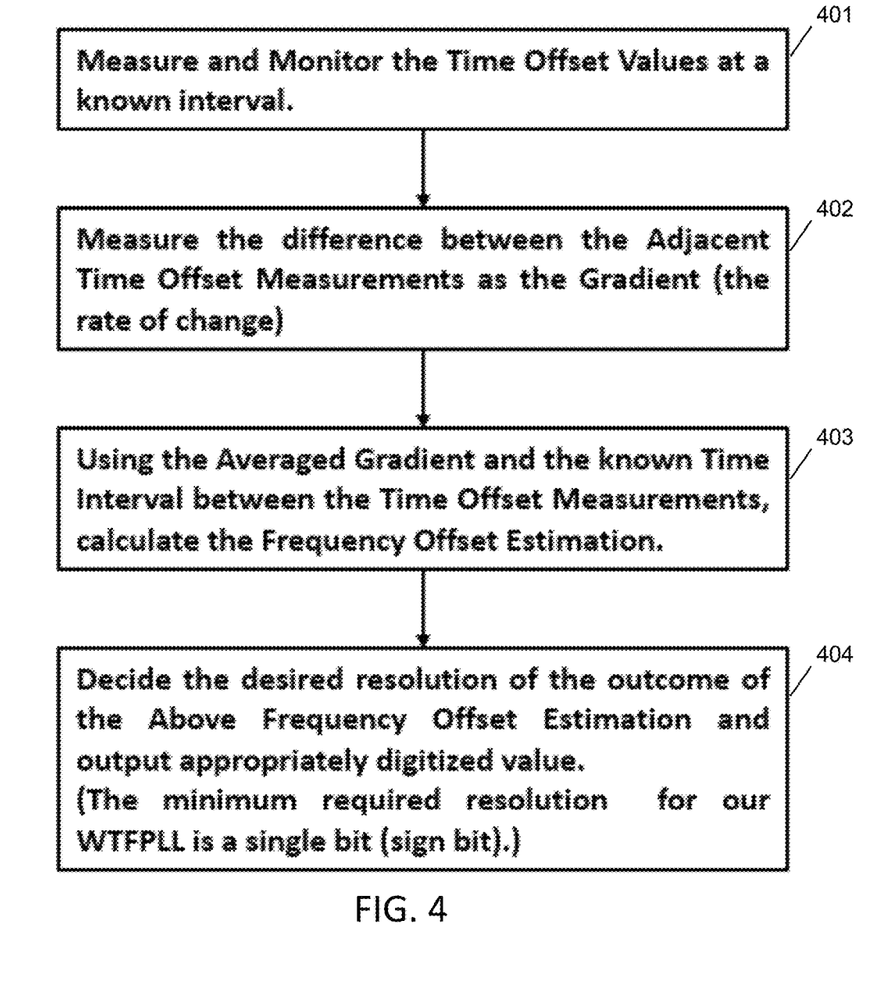
FIG. 4 is a flowchart showing synchronization, in accordance with some embodiments.

FIG. 4 is a flowchart showing synchronization, in accordance with some embodiments and in particular in accordance with method 1, using the time offset measurements derived from the time stamp. At step 401, the time offset detector measures and monitors (i.e., samples) time offset values at a known interval. At step 402, the difference between the sampled adjacent time offset measurements is measured; this is the gradient or derivative of the time offset. At step 403, using the averaged gradient and the interval, the frequency offset estimation is calculated. At step 404, after deciding the desired resolution of the outcome of the frequency offset estimation, the calculated estimate is reduced to the desired resolution and output. The minimum required resolution in some embodiments is a single bit (e.g., a sign bit).

Method 2: The second method is to use the frame data or preamble content and evaluate frequency offset. At its minimum, the method only requires the direction of change of the time offset. Detecting it should be a straightforward operation if preamble content or beacon signals are used. By monitoring the direction and rate of the phase rotation of the received preamble or beacon signal, we can estimate the frequency offset—the resolution of the estimation can be as low as a single bit (direction only) outcome for the system to work.

Method 3: The third method is to utilize the patented Blind Carrier Synchronization technique, which is described in U.S. Pat. Nos. 9,048,980 and 9,048,979. The advantage of this method is that the system does not rely on any reference signals, beacons or preambles as means to measuring frequency offsets. This method also results in highly accurate estimate of frequency offset and can make a large difference in performance, especially where the application is expected to experience Doppler shift due to movements. This point is further addressed in a later section.

Time and Frequency Control Logic

Even if the Time edge of the SU is found to be faster than that of MU after the evaluation of the Time Offset Detection, it is not yet clear whether or not we should increase or decrease the frequency of the SU reference crystal. For instance, if the reference crystal of SU is actually faster than that of MU but the Time edge of SU is found to be lagging behind that of MU, we don't want to increase the SU crystal frequency as it is already faster and its Time edge is expected to catch up eventually with that of MU. And similar reasoning applies if the situation is reversed. Therefore, the only time we want to update the control voltage for the SU crystal is when (a) the Time edge of SU is lagging and the SU crystal is slow, or (b) the Time edge of SU is leading and the SU crystal is faster. This observation is reflected in designing of the Time and Frequency Control Logic, which is fed to the Digital Loop Filter that outputs the crystal control voltage of SU. The logical operation for controlling the crystal oscillator (VCXO) of SU is summarized as follows:

$$XTL_{up} = (Time_{SU} < Time_{MU}) \cdot (f_{SU} < f_{MU}) \tag{1}$$

$$XTL_{Down} = (Time_{SU} > Time_{MU}) \cdot (f_{SU} > f_{MU}) \tag{2}$$

Figure 5:
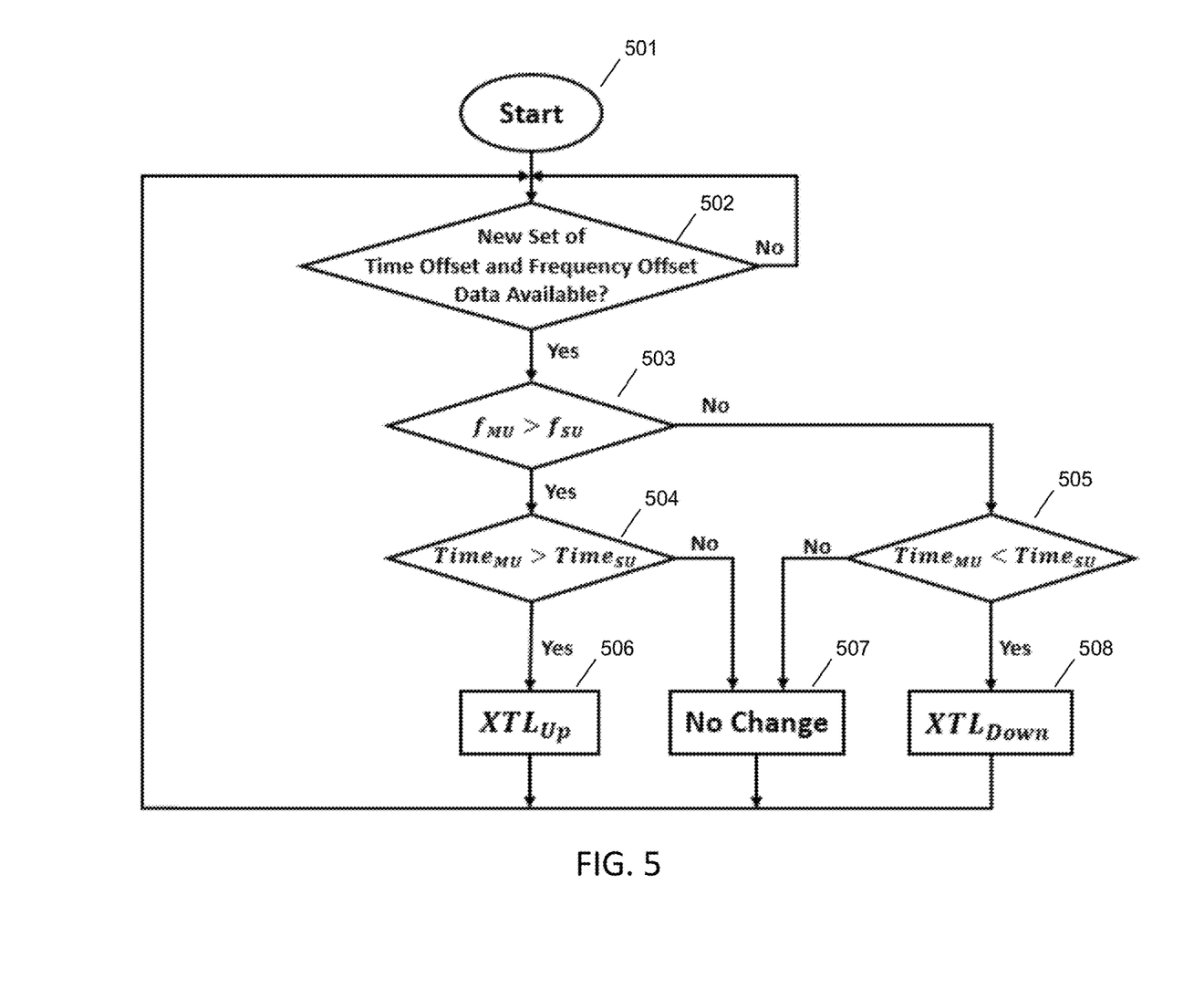
FIG. 5 is a flowchart showing determining whether to increase a clock reference signal, in accordance with some embodiments.

Time$_{SU}$ and Time$_{MU}$ refer to the local clocks of SU and MU respectively and f$_{SU}$ and f$_{MU}$ refer to the carrier frequencies of SU and MU respectively. XTL$_{Up}$ indicates that the SU's VCXO control voltage should be increased toward increasing the crystal oscillator frequency whereas XTL$_{Down}$ indicates that the VCXO control voltage should be decreased toward lowering the crystal oscillator frequency. In general, this XTL$_{Up}$ and XTL$_{Down}$ signals will be logically converted into a controlling voltage signal appropriate for the particular VCXO used. This controlling voltage will then be fed to the Digital Loop Filter prior to being fed to the VCXO. Above logical operation of Time and Frequency Control block is described in the flowchart below as one version of implementation:

FIG. 5 is a flowchart showing determining whether to increase a clock reference signal, in accordance with some embodiments. At step 501, processing starts and proceeds to step 502. At step 502, if a new set of time and frequency offset data becomes available, processing proceeds to step 503; else processing returns to start 501. At step 503, the frequency offset sign bit is examined to determine whether the frequency of the master is greater than the frequency of the slave; if yes, processing proceeds to step 504; if no, processing proceeds to step 505. At step 504, which is performed only if f$_{MU}$>f$_{SU}$, determination occurs regarding whether the time at the master is greater than the time at the slave, e.g., based on examination of the time offset sign. If the time at the master is greater than the time at the slave (and at this step it is also known that f$_{MU}$>f$_{SU}$), a signal to increase the frequency of the local reference crystal is generated at step 506, and processing restarts.

At step 505, if the time at the master is less than the time at the slave, and at this step it is also known that f$_{MU}$ is less than or equal to f$_{SU}$, a signal to decrease the frequency of the local reference crystal is generated at step 508, and processing restarts. However, if the tests at either step 504 or step 505 have a negative value, no change is made to the frequency of the reference crystal at 507.

Digital Loop Filter

As the overall Time and Frequency Lock Loop is a Closed Loop system with feedback, the stability and the performance of the overall system depends on the overall system parameters as a feedback system. A Digital Loop Filter is used within the feedback loop to decide the Bandwidth, Phase Margin, and the overall Order of the closed-loop system. When the overall WTFLL reaches stable state the overall system behavior can be modelled as a linear system in terms of the relative clock phases between the MU and SU clocks. It is similar to a typical Phase Lock Loop (PLL), and its linearized model is depicted in FIG. 6 below.

Figure 6:
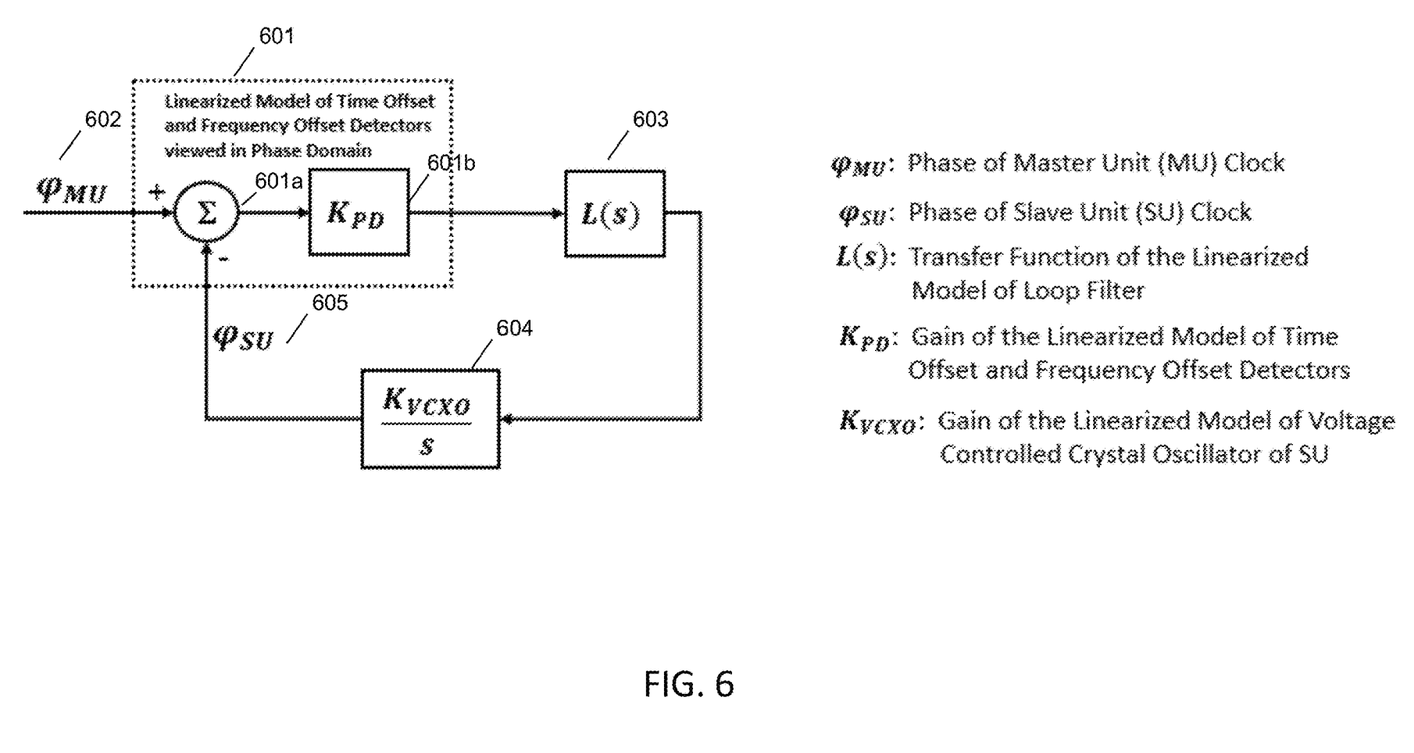
FIG. 6 is a logical block diagram showing a functional representation of a synchronization system in the phase domain, in accordance with some embodiments.

FIG. 6 is a logical block diagram showing a functional representation of a synchronization system in the phase domain, in accordance with some embodiments. 601 is a linearized model of the time offset and frequency offset detectors described herein, viewed in the phase domain. 601a is a summation block of the input phase of the master unit φ$_{MU}$ 602 with the local phase of the slave unit φ$_{SU}$ 605. The offset detectors have a gain KPD, which is shown as a functional block at 601b. 603 is the transfer function L(s) of the linear model of the loop filter, which transforms the output of 601 and sends it to the voltage-controlled crystal oscillator (VCXO). 604 is the gain of the VCXO itself, KVCXO/s, which results in the phase of the slave unit φ$_{SU}$ 605.

When the Wireless Time and Frequency Lock Loop (WTFLL) reaches stable state, its behavior can be modeled as a Phase Lock Loop as shown here. The Loop filter L(s) can be customized to achieve a desired loop behavior of the closed loop system as in a typical PLL system.

The transfer function of the overall system can then be expressed as follows:

$$H(s) = \frac{\varphi_{SU}(s)}{\varphi_{MU}(s)} = \frac{K \cdot L(s)}{s + K \cdot L(s)} \quad (3)$$

where $$K = K_{PD} \cdot K_{VCXO} \quad (4)$$

This equation shows clearly that the Loop filer, L(s), which represents the Digital Loop Filter in the WTFLL, plays a critical role in defining overall system parameters. Design of such Loop filter in a well-established procedure in a typical PLL design.

Frequency Offset Measurement in the presence of Doppler Effect

When the relative position between MU and SU are changing the two units will experience Doppler Effect. For example, when the two units are moving away, SU's frequency offset detector will observe the MU's carrier frequency to be lower than it actually is, and vice versa. In conventional communication networks, such as Wi-Fi or cellular networks, the frequency synchronization routine is incapable of discerning the difference between Doppler-effect-induced frequency offset and the actual hardware frequency offsets caused by mismatches between their reference crystals. However, if a true Time and Frequency Lock is to be maintained even in the presence of Doppler effect, being able to discern the separate sources of the observed frequency offsets is a critical feature. Conventional wireless networks lack such feature, which is one of the main practical obstacles preventing conventional wireless networks from achieving a high degree of frequency synchronization, not to mention frequency locked system.

In contrast, the overall system is designed to achieve such a highly synchronization quality that it actually achieves "Phase Lock Status" between two nodes. In order to maintain such high degree of synchronization, the system must address Doppler effects. The present disclosure overcomes the synchronization challenges stemming from Doppler effect as follows:

When the two nodes contain carrier frequency mismatch and experience Doppler effect at the same time, the net outcome is that: (a) Doppler component of the frequency mismatch is observed by both units in same manner (we'll address it as common-mode offset from here on)—e.g., both units observe lower than actual carrier frequency of the received signals if they are moving away, and (b) true offset component (the actual difference of their carrier frequencies) are observed as a differential quantity (we'll address it as differential-mode offset from here on.) This phenomenon is illustrated in FIG. 7 below.

Figure 7:
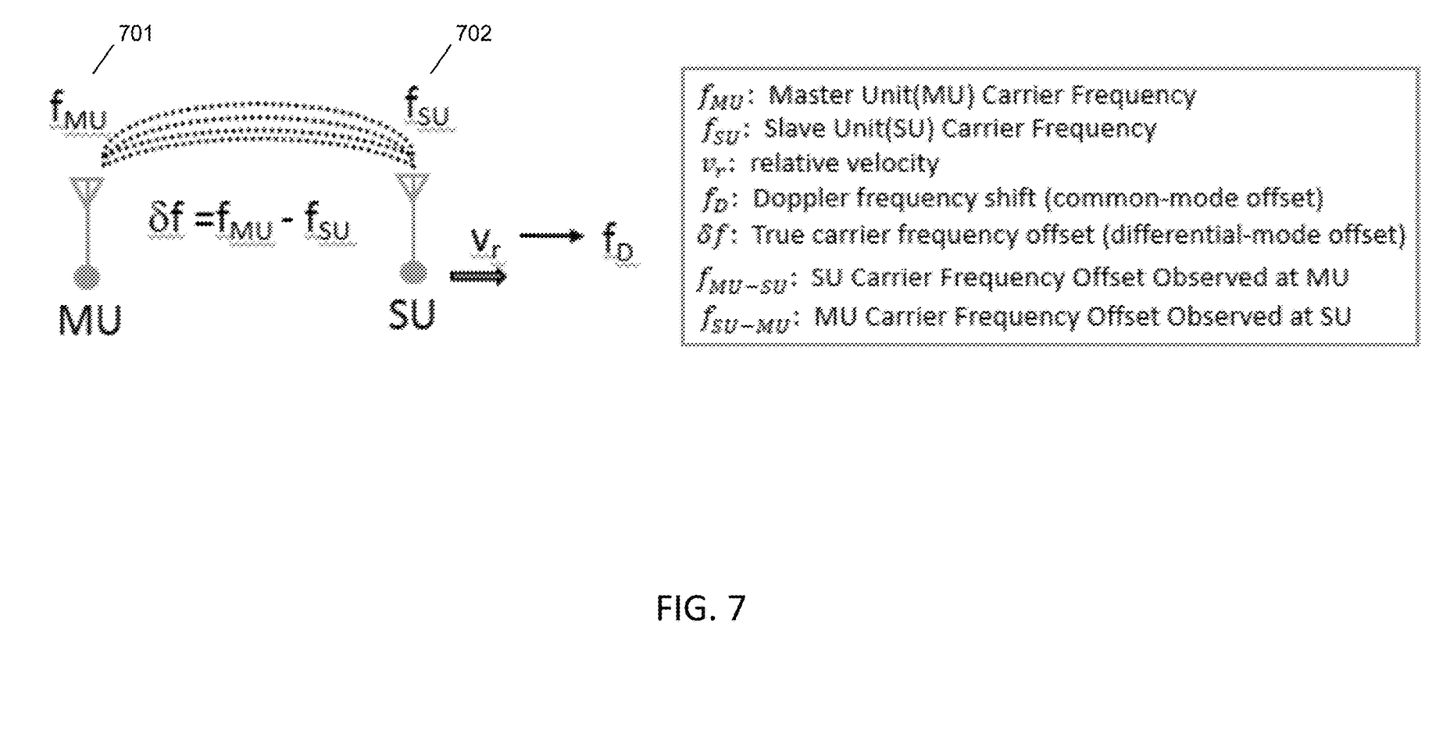
FIG. 7 is a schematic diagram showing a functional representation of a synchronization system in the frequency domain, in accordance with some embodiments.

FIG. 7 is a schematic diagram showing a functional representation of a synchronization system in the frequency domain, in accordance with some embodiments. f$_{MU}$ 701 is the master unit carrier frequency. f$_{SU}$ 702 is the slave unit carrier frequency. The transfer function between the master and the slave is δf, here also called the true carrier frequency offset or the differential mode offset; δf=f$_{MU}$−f$_{SU}$, with its sign depending on whether it is observed at the master or the slave. However, in the case that either the master or the slave is in motion, another frequency shift due to the Doppler effect may occur; this is shown in the diagram as f$_D$ and is also referred to as common-mode offset. $f_D$ is based on the direction and magnitude of relative velocity $v_r$.

When the Doppler effect is present due to the relative position movement, both MU and SU observe the arriving carrier frequency changes in the same way (same quantity and sign: common-mode offset.) In contrast, the frequency offset stemming from the actual mismatch in their reference crystals is observed as the differential difference (same quantity but opposite in sign: differential-mode offset.)

Taking advantage of this observation the system allows exchange of frequency offset measurements between MU and SU as part of Frequency Offset Detection operation. Once the frequency offset measurement values form SU ($f_{SU-MU}$) and MU ($f_{MU-SU}$) are available to SU, SU unit's Frequency Offset Detector can separate the Doppler component ($f_D$) and true offset component ($\delta f$) according to the equations shown below:

$$f_{MU-SU} = f_{MU} - (f_{SU} - f_D) = \delta f + f_D \quad (5)$$

$$f_{SU-MU} = f_{SU} - (f_{MU} - f_D) = -\delta f + f_D \quad (6)$$

$$f_D = \frac{f_{MU-SU} + f_{SU-MU}}{2} \quad (7)$$

$$\delta f = \frac{f_{MU-SU} - f_{SU-MU}}{2} \quad (8)$$

Only the differential component in above calculations should be used in maintaining the Time and Frequency Lock of the wireless link as the differential component is the only actual frequency offset stemming from the mismatch between their reference crystals between MU and SU. This ability to separate the actual physical frequency offset from the Doppler effect allows the overall system to maintain true synchronization of Time and Frequency even in mobile environments—in other words "wirelessly phase locked" status.

Furthermore, accurate measurements of the common-mode component (Doppler component) also provide very useful accurate relative velocity (or speed) between two nodes. This is a highly desirable feature for various potential applications where accurately detecting the speed of a target is an important feature, such as network-based athlete tracking systems, mobile vehicle mesh networks with position tracking, or a drone fleet formation, etc. In such applications being able to separate Doppler effect from the actual hardware offset is a very useful and a critical tool for direct velocity measurements of mobile. For example, once the Doppler measurement, $f_D$ is available the relative velocity of the two nodes can directly be calculated as shown in the equation below:

$$v_{rel} = \frac{f_D}{f_{SU}} \cdot c \quad (9)$$

where $v_{rel}$ is the relative speed observed by SU and c is the speed of light. This method of directly calculating the relative velocity from Doppler measurement provides superior accuracy of speed measurement compared to the method relying on the derivate of the position vectors.

Further Considerations

In the prior art, frequency is synchronized to achieve low error rate, and time is not synchronized beyond a simple network time synchronization, i.e., no synchronization of time is pursued between the transmitter and the receiver. The present disclosure describes a coherent approach to time (phase) and frequency synchronization, i.e., where one effort is not operating to undermine or fight the other effort. In some embodiments, the term "coherent logic" is used to mean that the frequency and time offset processing is being performed with consideration for the other, such that one offset processing effort is not fighting the other. In some embodiments, processing of each sample may be performed for both time and frequency offset, thus in a sense "simultaneously" comparing frequency offset and phase offset for a given signal. This is improved over the prior art, in which time and frequency offset are determined based on processing of different samples (for example, processing of a time offset may happen at connection establishment, or never, while frequency offset may be performed periodically).

In some embodiments, time stamp exchange may be performed at a closely spaced time interval for better accuracy. A delay for time stamp exchange can be reduced in some embodiments, for example by performing computation of time stamp messages in the PHY level of the radio hardware, thus creating essentially automatic response in the PHY level of radio hardware. Time stamp computations, such as: receiving time stamps; extracting time stamps; creating new time stamps; sending time stamp responses may be performed at the lower layer. As these responses may be done at a PHY level, they may be transparent to higher layers. Alternately, higher layer processing may be used to perform time stamp processing.

In some embodiments, a reference signal from a master wireless device is described. This reference signal may provide both a high-precision time stamp and a frequency offset component as part of the signal, in some embodiments, thus enabling both frequency and time offset processing steps to be performed using the single received signal. The received signal may include a preamble or beacon, in some embodiments. The inventors have contemplated the use of other embodiments in which time stamps are sent separately from a preamble or beacon; however, it is noted that some methods, such as utilizing cross-correlation of the received RF signal, do not require any particular signal (e.g., they are "blind"), and therefore a time stamp could be used to handle both time offset and synchronization and frequency offset computations (with the frequency offset being extracted from the RF carrier of the time stamp signal). In some embodiments, the time stamp can be modulated, and then the one signal can be used to determine both frequency and time offset. When the master transmits the time stamp, this is a 2-in-1 message because it comes with a carrier with an embedded frequency offset.

In some embodiments, the phrase "phase lock" is used, although phase is a relative term and shifts over 360 degrees, to mean time lock; the present disclosure provides a lock of both time and frequency, e.g., a time and frequency locked loop.

In some embodiments, a voltage-controlled crystal oscillator is used. Many systems are not designed to enable synchronization by tweaking crystal voltages, as electronic devices typically are designed to operate within the error tolerance of typical crystals. PLL are typically used to tweak electronic VCOs, which are noisy devices whose reference signals are crystals. IEEE 1588 does not require this kind of lock because systems are not designed to tweak crystals. In the present disclosure, where a signal input is available to tune or tweak a crystal, the crystal is intended to be tuned. The lock-in range of our invention is limited only by the range of VCXOs (Voltage Controlled Oscillators) that we are trying to tune (the target of the Frequency and Time Lock Loop.) High-end crystal oscillators (XOs) come with tweaking signals; as do controllable oven-compensated crystal oscillators (OCXOs) or voltage-controlled crystal oscillators (VCXOs). Each of these has been appreciated by the inventors to be usable with the present disclosure.

A phase-locked loop typically has various other uses, such as: frequency division; coherent modulation and demodulation; threshold extension; synthesis of new frequencies, etc. These are possible to be performed at the local device in synchrony with the master device, as with a typical PLL. In addition, the advantage of being closely synchronized with the master device enables relative velocity tracking, recovery of small signals that would otherwise be hard to retrieve from noise, etc.

From the foregoing, it will be clear that the present invention has been shown and described with reference to certain embodiments that merely exemplify the broader invention revealed herein. Certainly, those skilled in the art can conceive of alternative embodiments. For instance, those with the major features of the invention in mind could craft embodiments that incorporate one or major features while not incorporating all aspects of the foregoing exemplary embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for wirelessly synchronizing a slave device to a master device, comprising:
   receiving, wirelessly at a local device, a master device reference signal comprising a modulated radio frequency (RF) signal from a master device, the master device reference signal including both time offset information and radio frequency offset information, the master device reference signal being an arbitrary modulated RF signal;
   receiving, wirelessly at the local device, a master device time stamp from the master device;
   computing a time offset of the master device reference signal relative to a local reference oscillator signal of a local oscillator, using the master device time stamp;
   computing a radio frequency signal frequency offset of the master device reference signal relative to the local reference oscillator signal, using radio frequency characteristics of the master device reference signal;
   generating a local reference oscillator control signal based on the computed time offset and the computed radio frequency signal frequency offset; and
   adjusting the local reference oscillator to maintain a frequency and time lock with the master device reference signal at the local device,
   wherein computing the time offset and the radio frequency signal frequency offset is performed using baseband signal samples of the master device reference signal, and
   wherein computing the radio frequency signal frequency offset is performed by performing blind carrier synchronization.

2. The method of claim 1, further comprising adjusting the local reference oscillator to maintain frequency and time lock with the master device reference signal at the local device, and wherein the local reference oscillator may be a voltage controlled crystal oscillator.

3. The method of claim 1, further comprising extracting both the master device time stamp and the master device reference signal from the modulated RF signal from the master device.

4. The method of claim 1, further comprising adjusting the local reference oscillator to increase frequency based on the frequency offset signal and time offset signal each having a positive magnitude.

5. The method of claim 1, further comprising adjusting the local reference oscillator to decrease frequency based on the radio frequency signal frequency offset having a positive magnitude and the time offset having a negative magnitude.

6. The method of claim 1, further comprising maintaining the time offset and the radio frequency signal frequency offset within a hold-in range of the frequency and time lock.

7. The method of claim 1, further comprising using high-resolution time sample interpolation for computing the time and radio frequency signal frequency offsets.

8. The method of claim 1, further comprising sending, from the local device to the master device, a first time stamp message, and receiving, from the master device, a second time stamp message, the second time stamp message including a first time stamp message receipt time, thereby exchanging time stamp measurements.

9. The method of claim 8, further comprising calculating a path delay based on the first and the second time stamp messages, and using the calculated path delay to determine a primary frequency offset component and a Doppler-induced frequency offset component of the master device reference signal.

10. The method of claim 1, further comprising monitoring a derivative of time offset and using the derivative to perform frequency offset computation.

11. The method of claim 1, further comprising computing the radio frequency signal frequency offset using squares or absolute values of an in-phase signal and a quadrature signal of the master device reference signal with orthogonal in-phase and quadrature signal components.

12. The method of claim 1, further comprising computing the radio frequency signal frequency offset by accumulating a cumulative phase measurement of a plurality of differential phases between successive complex signal points greater than a threshold.

13. The method of claim 1, further comprising extracting a Doppler shift offset component from frequency offset of the master device reference signal, and adjusting the local reference oscillator while the local device is in motion relative to the master device.

14. A system for synchronizing a slave device to a master device, comprising:
   an antenna configured to wirelessly receive a master device reference signal from the master device via a wireless modulated radio frequency signal;
   a tunable reference crystal oscillator for outputting a reference signal at the slave device;
   a time offset detector coupled to a local reference output of a reference crystal oscillator and to a time stamp extractor, the time stamp extractor configured to extract a master device time stamp from the master device reference signal, the time offset detector configured to detect a relative timing difference between the local reference output and the master device time stamp;
   a frequency offset detector coupled to the local reference output of the reference crystal oscillator and to the master device reference signal output of the antenna, the frequency offset detector configured to detect a relative frequency offset between the local reference output and the master device reference signal output using radio frequency characteristics of the master device reference signal;
   a time and frequency control logic circuit coupled to an output of the time offset detector and an output of the frequency offset detector and outputting a reference crystal oscillator control signal based on whether the master device reference signal is leading or lagging the reference crystal oscillator reference signal in time and also based on whether the master device has a carrier frequency that is faster or slower than that of the slave device; and
   a digital loop filter coupling the reference crystal oscillator control signal to the reference crystal oscillator,
   wherein the master device reference signal is an arbitrary wireless signal with a known carrier frequency,
   thereby providing a closed loop control system for both frequency offset and time offset of the reference crystal oscillator to be synchronized wirelessly with the master device reference signal in a single processing chain, enhancing effectiveness of both frequency offset and time offset adjustment.

15. The system of claim 14, wherein the time offset detector further comprises a high-precision time interpolation circuit.

16. The system of claim 14, wherein the time and frequency control logic circuit is further configured to output the reference crystal oscillator control signal based on whether:
- the reference crystal oscillator reference signal is running faster than the master device and leading the master device;
- the reference crystal oscillator reference signal is running faster than the master device and lagging the master device;
- the reference crystal oscillator reference signal is running slower than the master device and leading the master device; or
- the reference crystal oscillator reference signal is running slower than the master device and lagging the master device.

17. The system of claim 14, wherein the slave device is configured to exchange time stamps with the master device by sending, from the local device to the master device, a first time stamp message, and receiving, from the master device, a second time stamp message, the second time stamp message including a first time stamp message receipt time; and wherein the master device is configured to process the first time stamp message and generate the second time stamp message at a PHY (physical layer) processing layer.

18. The system of claim 17, wherein a high precision time interpolation circuit is used to perform time stamping at a time stamping resolution finer than a sampling clock of the slave device.

\* \* \* \* \*